United States Patent [19]

Ariga et al.

[11] Patent Number: 4,596,832

[45] Date of Patent: Jun. 24, 1986

[54] PROCESS FOR PRODUCING THERMOPLASTIC RESIN FOAM

[75] Inventors: Nagao Ariga; Kyotaro Shimazu, both of Chiba; Hiroyuki Sato, Yachiyo, all of Japan

[73] Assignee: Dainippon Ink and Chemicals, Inc., Tokyo, Japan

[21] Appl. No.: 724,509

[22] Filed: Apr. 19, 1985

Related U.S. Application Data

[63] Continuation of Ser. No. 462,336, Jan. 31, 1983, which is a continuation of Ser. No. 286,856, Jul. 27, 1981, abandoned.

[30] Foreign Application Priority Data

Jul. 28, 1980 [JP] Japan ................................ 55-102393
Apr. 20, 1981 [JP] Japan ................................ 56-58402
Apr. 21, 1981 [JP] Japan ................................ 56-59186

[51] Int. Cl.$^4$ .............................. C08J 9/08; C08J 9/22
[52] U.S. Cl. ......................................... 521/58; 264/54; 264/DIG. 9; 521/60; 521/79; 521/92; 521/93; 521/147
[58] Field of Search ................... 521/92, 93, 79, 147, 521/58; 264/53

[56] References Cited

U.S. PATENT DOCUMENTS

| | | | |
|---|---|---|---|
| 3,406,230 | 10/1968 | Baxter et al. | 521/79 |
| 4,207,402 | 6/1980 | Sprenkle | 521/95 |
| 4,306,036 | 12/1981 | Corbett | 521/79 |
| 4,307,202 | 12/1981 | Corbett | 521/79 |

*Primary Examiner*—Morton Foelak
*Attorney, Agent, or Firm*—Sherman & Shalloway

[57] ABSTRACT

In producing a foam by foaming a melt-plasticized styrene/maleic anhydride copolymer resin, a process for producing a highly foamed styrene/maleic anhydride copolymer resin foam characterized by using as the blowing agent at least one compound selected from the group consisting of a carboxylate of a metal of group Ia of the periodic table of elements, a carbonate of a metal of group Ia, a carboxylate of a metal of group IIa and a carbonate of a metal of group IIa; or by first blending with said copolymer resin at least one compound selected from the group consisting of a carboxylate of a metal of group Ia of the periodic table of elements, a carbonate of a metal of group Ia, a carboxylate of a metal of group IIa and a carbonate of a metal of group IIa, then melt-blending the mixture, followed by extruding and granulating the blend to form a pre-expanded granular product, and thereafter foaming the granular product thus obtained.

7 Claims, No Drawings

PROCESS FOR PRODUCING THERMOPLASTIC RESIN FOAM

This application is a continuation of application Ser. No. 462,336, filed Jan 31, 1983 which is a continuation application of Ser. No. 286,856 filed July 27, 1981, now abandoned.

This invention relates to a process for producing a highly foamed styrene/maleic anhydride copolymer resin foam.

In producing a thermoplastic resin foam say by the extrusion molding technique, the usual process for obtaining the desired shaped article comprises extruding a blowing agent-containing melt-plasticized resinous composition from a pressurized state into an atmosphere of normal pressure thereby effecting the expansion of the resinous composition by its change in pressure.

Polystyrene and polyethylene are well known as being typical all-purpose thermoplastic resins for use in the foregoing process. Especially in the case of polystyrene, since the dependence on temperature of its melt viscosity is small and thus low-temperature extrusion is possible, not only the choice of the blowing agent is simplified, but also a viscosity suitable for foaming can be readily obtained. It is hence possible to form highly foamed products relatively easily by the use of a low-boiling blowing agent. Usable as this blowing agent are the inert gases such as carbon dioxide, nitrogen and helium, saturated aliphatic hydrocarbons of up to 8 carbon atoms such as methane, ethane, propane, butane and pentane, the halogenated hydrocarbons such as methylene chloride and Freon, saturated alicyclic hydrocarbons such as cyclohexane ethylcyclopentane, aromatic hydrocarbons such as benzene and xylene, ketones such as acetone and methyl ethyl ketone, and petroleum ethers, etc.

In using a low-boiling blowing agent, a costly apparatus for metering the high-pressure gas to be introduced into the extruder from a cylinder is required. Further, care must be exercised to ensure against such hazards as explosions and poisoning resulting from the leakage of the blowing agent gas.

On the other hand, there are available inorganic and organic chemical blowing agents, which do not require the use of costly apparatuses and in which there is practically no need to consider such hazards as explosions and poisoning. Inorganic chemical blowing agents that are usually used include, for example, sodium hydrogencarbonate, ammonium carbonate, ammonium hydrogencarbonate, sodium borohydride and light metals (e.g. Mg, Zn and Al). On the other hand, the usually used organic chemical blowing agents include, for example, azodicarbonamide, azobisformamide, azobisisobutyronitrile, diazoaminobenzene, N,N'-dinitrosopentamethylenetetramine, N,N'-dimethyl-N,N'-dinitroterephthalamide, benzenesulfonyl hydrazide, p-toluenesulfonyl hydrazide and p,p'-oxybisbenzenesulfonyl hydrazide. However, in the method which uses these chemical blowing agents the blowing agent forms cells by the separation and association of the gas in solution in the resin, with the consequence that there is no quenching and hardening of the membranes of the cells. Hence, the permeability of the gas evolved is great, and thus a highly foamed product cannot be readily obtained.

Our extensive styrene/maleic with the view of obtaining a highly foamed product free of the aforementioned drawbacks of the prior art led to the discovery that by using a dry blended resinous composition consisting of a styrele/maleic anhydride copolymer resin and as a blowing agent at least one compound selected from the group consisting of a carboxylate of a metal of group Ia of the periodic table of elements, a carbonate of a metal of group Ia, a carboxylate of a metal of group IIa and a carbonate of a metal of group IIa and foaming this composition by say extrusion molding, it was possible to obtain a highly foamed product having an expansion ratio of at least 8 times, an expansion ratio impossible of attainment by the use of conventional chemical blowing agents.

Specifically, in accordance with the present invention, 0.1–10% by weight, preferably 0.5–5% by weight, of the aforesaid blowing agent that has been rendered into a powdered state in advance and 99.9–90% by weight, preferably 99.5–95% by weight, of a styrene/maleic anhydride copolymer resin optionally added a small quantity of a mineral oil are dry blended, after which the blend is heat-melted and foamed say by extrusion molding or injection molding to give a foamed product. It is thus possible to obtain a highly foamed product by the blowing gas that evolves as a result of the reaction between the styrene/maleic anhydride copolymer resin and the blowing agent.

Now, as regards the processes for producing the foams of the aforementioned thermoplastic resins inclusive of the styrene/maleic anhydride copolymer resin, in the case of say the usually employed extrusion molding method, there is (1) the so-called two-stage method which comprises first preparing a foamable resin by impregnating the resin with a low-boiling blowing agent such as the aforementioned freon, butane or pentane and thereafter feeding the so prepared foamable resin to the extruder where it is foamed to yield the intended foamed product or (2) the so-called one-stage method in which the foamed product is obtained either by introducing a low-boiling blowing agent such as described above into a melt-plasticized resin and extruding the blend while kneading it under pressure or by blending with the resin a chemical blowing agent that evolves either nitrogen or carbon dioxide, such as the aforementioned azodicarbonamide or sodium hydrogencarbonate, and feeding this blend to the extruder for extrusion therefrom.

In the case of the two-stage method described above, it is necessary that the foamable resin be prepared into foamable particles of uniform particle size before feeding it to the extruder. It is hence a disadvantage from the standpoint of the total cost involved because of the additional investment in the required equipment. On the other hand, in the case of the direct blowing agent injection system such as the one-stage method described hereinabove, this also has is shortcomings. Not only is there required a costly equipment such as an apparatus for injecting the blowing agent, but also there is the need to exercise special care to ensure against the hazards of explosion or poisoning due to leakage of the gas that is to become the blowing agent. Above all, in the case where the method that uses the aforementioned chemical blowing gents is adopted, the expansion ratio is at most about 3 times. There was thus the drawback that highly foamed products could not be obtained.

After having discovered the basic method of obtaining a highly foamed product by the use of a specified compound as the blowing agent, as hereinbefore described, we furthered our research concerning embodiments thereof. As a result thereof, we found a much more advantageous process, a process by which all of the shortcomings of the conventional methods could be eliminated.

There is thus provided in accordance with this invention a process that is operated in the following manner. The aforesaid blowing agent is blended with a styrene/maleic anhydride copolymer resin in a hereinbefore-indicated proportion. The blend thus obtained is fed to an extruder where it is uniformly melt-blended and extruded from a pellet die of the extruder at such a temperature as to obtain an expansion ratio of not greater than 2.0 times, and preferably not greater than 1.5 times. The resulting preexpanded pellets are then fed to a usual foaming apparatus to yield the intended highly foamed product.

The term "styrene/maleic anhydride copolymer resin", as used herein, denotes a copolymer resin that is obtained by heat-polymerizing monomeric styrene with maleic anhydride in the presence of a chain transfer agent and a radical generator. Such a styrene/maleic anhydride copolymer resin (SMA resin) can be specifically produced by say a procedure comprising adding to a ketonic solvent such as acetone or methyl isobutyl ketone a monomeric mixture of styrene and maleic anhydride in a mole ratio of 1.4–49, preferably 4.6–17.0, with a known radical generator and a chain transfer agent, followed by carrying out the heat-polymerization reaction at 60°–180° C., preferably 75°–140° C., and thereafter precipitating the resulting polymer using say a poor solvent such as petroleum benzene or methanol. The SMA resin may be one that has been granulated by means of an extruder after having been added an antioxidant, as required.

Suitably used as this SMA resin is one having a weight average molecular weight (Mw) of preferably 100,000–400,000, and more preferably 150,000–300,000 as measured by gel permeation chromatography, i.e. GPC based on a polystyrene standard method.

The metals of group Ia are typically lithyium, sodium and potassium, while the metals of group IIa are magnesium, calcium and strontium. Typical examples of the carboxylic acids are aliphatic monocarboxylic acids such as formic acid, acetic acid, propionic acid, butyric acid, caprylic acid, capric acid, lauric acid, stearic acid and myristic acid; aliphatic saturated or unsaturated dicarboxylic acids such as oxalic acid, malonic acid, succinic acid, glutaric acid, maleic acid, fumaric acid and glutaconic acid; hydroxymonocarboxylic acids such as glycollic acid, lactic acid, ethylenelactic acid and glyceric acid; hydroxypolycarboxylic acids such as malic acid, tartaric acid and citric acid; and aromatic carboxylic acids such as benzoic acid and terephthalic acid. Typical carbonates are say sodium carbonate potassium carbonate and sodium hydrogencarbonate.

While this sodium hydrogencarbonate strictly speaking is a hydrogencarbonate, it forms as a result of thermal decomposition sodium carbonate in the following manner.

$$2NaHCO_3 \rightarrow Na_2CO_3 + CO_2 + H_2O$$

Hence, in the process of this invention it is considered to be a substance having effects equal to a carbonate of an alkali metal.

Further, since sodium hydrogencarbonate evolves carbon dioxide on thermal decomposition, it is possible to consider it to be one of the so-called chemical blowing agents. However, this carbon dioxide does not possess any substantial effect in obtaining the highly foamed product of aforesaid SMA resin.

The carboxylates and carbonates are used as blowing agents in this invention either independently of each other or in combination. Of these blowing agents, those containing water of crystallization are especially preferred.

Further, it is preferred to add to the SMA resin as a wetting agent a mineral oil such as CARNATION (a product of Witco Chemical Corp. U.S.A.) or as a lubricant a metallic soap such as zinc stearate in practicing the process of this invention. Such nucleating agents as talc, calcium silicate and kaolin can also be added, as required. These nucleating agents should preferably be of the finest possible particle size for achieving a uniform mixture with the blowing agent. Usually preferred is a powder having particles of diameter of the order of 0.1–10 microns. These additives should be added to the SMA resin prior to the addition of the blowing agent.

In practicing the process of this invention, it is preferred that an auxiliary foaming agent be added. As such an auxiliary foaming agent, mention can be made of the inorganic salts having water of crystallization whose dehydration temperature is relatively close to the extrusion die temperature, such as $CaSO_4.2H_2O$ (dehydration temperature 163° C.), $Na_2SO_4.9\ 10H_2O$ (dehydration temperature 100° C.), and $CaHPO_4.2H_2O$.

These auxiliary foaming agent serve to slow down the reaction between the blowing agent and the SMA resin to a still greater degree and thus cause the reaction-evolved carbon dioxide to remain in the resin for a maximum period of time.

In carrying out the process of this invention, the setting of the expansion ratio of the pre-expanded pellets and the choice of the extrusion die to be used in the secondary foaming operation are important factors, since these factors greatly influence the expansion of the final foamed product.

In the first place, the extrusion temperature for obtaining the pre-expanded pellets should preferably be low for restraining the pre-expansion as much as possible. A temperature in the neighborhood of 130°–140° C. is usually used. On the other hand, the pre-expansion ratio, as previously indicated, should preferably be not greater than 2 times.

The foaming method by means of an extrusion die for carrying out the secondary foaming include such methods as the T-die extrusion molding method, the circular die extrusion incision method or circular die extrusion press-adhesion method, or the fish tail die extrusion molding method. Any of these known methods can be used in carrying out the process of this invention. The intended final expansion ratio should preferably range from 5 to 20 times.

The SMA resin foam thus obtained can be utilized for such applications as insulating boards, various lagging materials and building materials such as panels. Above all, it is expected to find use as a structural material possessing superior heat resistance.

The following examples and comparative examples will serve to illustrate the present invention more specifically. Unless otherwise specified, the parts and percentages used in the examples are on weight basis.

EXAMPLE 1

A styrene/maleic anhydride copolymer resin (990 g) having a melt flow rate (MFR) of 1.2 g/10 min (JIS Method K7210-1976, load: 5 kg, temperature: 200° C.) whose surface was coated with a small quantity of a mineral oil, and 10 g of powdered sodium acetate (Wako 1st grade, produced by Wako Jyunyaku Kogyo Co., Ltd., Japan) were thoroughly blended. The resulting blend was molded by extruding it through an extruder having a cylinder of 26-mm diameter [manufactured by Sanjo Seiki Co., Ltd., Japan, length/diameter ratio (L/D)=14, compression ratio 2.2] under the conditions of die temperature: 125° C., $C_1$: 225° C., $C_2$: 180° C., and screw rotation speed: 40 rpm.

The foam thus molded by extrusion had a satisfactory skin layer at its surface and was one whose interior was made up of minute cells 0.1-0.3 mm diameter. The expansion ratio of this foam was 9.8 times, this being calculated as follows:

$$\text{Expansion ratio} = \frac{\text{Specific gravity of styrene/maleic copolymer resin}}{\text{Specific gravity of foam}}$$

(This expansion ratio will apply equally in the following examples.)

EXAMPLE 2

Example 1 was repeated but using a styrene/maleic anhydride copolymer resin having an MFR of 0.41 g/10 min (maleic anhydride content 15%). The extrusion-molding was otherwise carried out as in Example 1.

The foam thus extrusion molded had a satisfactory skin layer at its surface and its interior was made up of minute cells 0.1-0.3 mm diameter. Its expansion ratio was 14 times.

EXAMPLE 3

The extrusion-molding operation was carried out as in Example 1, except that 970 g of a styrene/maleic anhydride copolymer resin having an MFR of 0.41 g/10 min and as the blowing agent 30 g of sodium oxalate (Wako 1st grade, produced by Wako Jyunyaku Kogyo Co., Ltd.) were used.

The thus extrusion-molded foam had a satisfactory skin layer at its surface, while its interior was made up of fine cells 0.2-0.5 mm diameter. The expansion ratio was 9.2 times.

EXAMPES 4

Example 3 was repeated but changing the amount used of the styrene/maleic anhydride copolymer resin to 990 g and using as blowing agent 10 g of sodium lactate instead of sodium oxalate. The resulting extrusion-molded foam had a good skin layer at its surface, and its interior was made up of fine cells 0.2-0.5 mm diameter. Its expansion ratio was 8.5 times.

EXAMPLE 5

The extrusion-molding was carried out by operating as in Example 3 but using instead of sodium oxalate an equal amount of sodium tartrate (Wako 1st grade, a product of Wako Jyunyaku Kogyo Co., Ltd.). The resulting foam had a good skin layer at its surface, and its interior was made up of minute cells 0.2-0.5 mm diameter. The expansion ratio of this foam was 9.0 times.

EXAMPLE 6

The experiment was operated as in Example 4, except that instead of sodium lactate an equal amount of sodium benzoate (Wako 1st grade, a product of Wako Jyunyaku Kogyo Co., Ltd.) was used. The resulting foam had a satisfactory skin layer at its surface, and its interior was made up of 0.1-0.4 mm diameter fine cells. The expansion ratio of this foam was 8.3 times.

EXAMPLE 7

Example 4 was repeated but using instead of sodium lactate an equal amount of magnesium acetate (Wako 1st grade, Wako Jyunyaku Kogyo Co., Ltd.). The resulting foam had a good skin layer at its surface, while its interior was made up of minute cells 0.2-0.5 mm diameter. The expansion ratio of the foam was 13 times.

EXAMPLE 8

The experiment was operated as in Example 3 but using instead of sodium oxalate an equal amount of calcium oxalate. The resulting foam had a satisfactory skin layer at its surface, and its interior was made up of fine cells 0.2-0.5 mm diameter. The expansion ratio of this foam was 9.2 times.

COMPARATIVE EXAMPLE 1

The extrusion-molding operation was carried out as in Example 1, except that the blowing agent used was changed to lead acetate (Wako 1st grade, a product of Wako Jyunyaku Kogyo Co., Ltd.). The extrusion-molded foam had a satisfactory skin layer at its surface, but its interior was made up of relatively large cells, and the expansion ratio was 3.2 times.

COMPARATIVE EXAMPLE 2

The extrusion-molding operation was carried out as in Example 1, except that the resin used was changed to DIC STYRENE XC-510 having an MFR of 1.6 g/10 min (a styrene resin produced by Dainippon Ink & Chemicals, Inc., Japan). The extrusion-molded foam had a rough surface, and its interior foaming was irregular. Moreover, its expansion ratio was 1.5 times.

EXAMPLE 9

The extrusion-molding operation was carried out as in Example 1 but using instead of sodium acetate an equal amount of sodium carbonate (Wako 1st grade, a product of Wako Jyunyaku Kog yo Co., Ltd.). The resulting foam had a good skin layer at its surface, and its interior was made up of 0.2-0.5 mm diameter fine cells. The expansion ratio of this foam was 10 times.

EXAMPLE 10

Example 2 was repeated but using instead of sodium acetate an equal amount of sodium carbonate (the same as that used above). The foam thus obtained had a satisfactory skin layer at its surface, and its interior was made up of fine cells 0.1-0.3 mm diameter. The expansion ratio was 13 times.

EXAMPLE 11

The extrusion-molding operation was carried out as in Example 1, except that the styrene/maleic anhydride copolymer resin used was one having an MFR of 0.41 g/10 min, which was used in an amount of 970 g, and the blowing agent was changed to 30 g magnesium carbonate (Wako 1st grade, a product of Wako Jyunyaku Kogyo Co., Ltd.).

The extrusion-molded foam had a satisfactory skin layer at its surface, and its interior was made up of fine cells 0.2-0.5 mm diameter. Its expansion ratio was 11 times.

EXAMPLE 12

Example 11 was repeated but using instead of magnesium carbonate an equal amount of sodium hydrogencarbonate. The foam thus obtained had a satisfactory skin layer at its surface, while its interior was made up of 0.2-0.5 mm diameter cells. The expansion ratio of this foam was 15 times.

EXAMPLE 13

The extrusion-molding operation was carried out as in Example 1, except that the molding machine used was changed to a 1-ounce in-line screw type injection molding machine (manufactured by Sanjo Seiki Co., Ltd., Japan), and sodium acetate was changed to an equal amount of sodium carbonate. The expansion ratio of the resulting foam was 2.3 times. The molding temperature conditions in this case were: $C_1 = 225°$ C., $C_2 = 200°$ C., and nozzle $= 180°$ C.

EXAMPLE 14

Example 13 was repeated but using instead of sodium carbonate an actual amount of sodium hydrogencarbonate. The expansion ratio of the resulting foam was 2.6 times.

EXAMPLE 15

A styrene/maleic anhydride copolymer resin (970 g) having an MFR of 0.41 g/10 min whose surface was coated with a small quantity of oil was thoroughly blended with 15 g of powdered sodium carbonate and 15 g of sodium acetate, after which the blend was extruded through a 26-mm diameter extruder.

The resulting foam had a good skin at its surface, and its interior was made up of 0.2-0.5 mm diameter minute cells. The expansion ratio of the form was 14 times.

COMPARATIVE EXAMPLE 3

The extrusion molding was carried out by operating as in Example 9, except that instead of sodium carbonate an egual amount of an iron carbonate (Wako 1st grade, a product of Wako Jyunyaku Kogyo Co., Ltd.) was used.

The extrusion-molded foam had a satisfactory skin layer at its surface, but its interior was made up of relatively large cells, and its expansion ratio was 1.7 times.

COMPARATIVE EXAMPLE 4

The extrusion-molding operation was carried out as in Example 9, except that the resin used was changed to DIC STYRENE XC-510 whose MFR was 1.6 g/10 min.

The surface of the extrusion-molded foam was rough, and its interior foaming was irregular. Its expansion ratio was 1.5 times.

COMPARATIVE EXAMPLE 5

The extrusion molding was carried out as in Example 12, except that the resin used was changed to DIC STYRENE XC-510. The surface of the resulting foam was rough, and its interior foaming was also irregular. Its expansion ratio was 3 times.

COMPARATIVE EXAMPLE 6

The extrusion molding was carried out as in Example 13 but using as the resin DIC STYRENE XC-510. Scarcely any foaming took place in the product, the expansion ratio being only 1.1 times.

COMPARATIVE EXAMPLE 7

The extrusion molding was carried out as in Example 14, except that the resin used was changed to DIC STYRENE XC-510. There was scarcely any foaming in the resulting product, the expansion ratio being only 1.5 times.

EXAMPLES 16–19 AND COMPARATIVE EXAMPLES 8–10

One hundred parts each of Dylark #232 and Dylark #332 (SMA resins produced by ARCO/Polymers Inc., U.S.A.) and DIC STYRENE CR-4500 (polystyrene produced by Dainippon Ink & Chemicals, Inc.), after having coated their surface with the spreading agents indicated in Table 1, were mixed with the alkali metal salts, lubricants, nucleating agents and auxiliary foaming agents indicated in said table in the amounts shown therein. The several mixtures were then melt-blended, after which the several blends were extruded through a 26 mm diameter extruder (manufactured by Sanjo Seiki Co., Ltd., Japan; L/D=14, compression ratio 2.2 and having two 3 mm diameter rod dies). The extrudate was pelleted by cutting it at a point 2–3 mm from the outlet of the die followed by quenching the so formed pellets. Pre-expanded pellets whose foaming has been restrained were thus obtained. The pelleting conditions were as follows:

|  | $C_1$ | $C_2$ | Die |
|---|---|---|---|
| Temperature | 225° C. | 150° C. | 130° C. |
| Screw rotation speed | | 40 r.p.m. | |
| Quenching conditions | | Water-cooled | |

The several pellets thus obtained were then severally foamed using a circular die extruder (manufactured by Union Plastics Co., Ltd., Japan, 50 mm diameter, L/D=24, compression ratio 36; die 23 mm (outside diameter/17.9 mm (inside diameter)). There was thus formed tubular foams. In this case the distance between the die and sizer was set at 500–1000 mm, and the following extrusion conditions were employed.

|  | $C_1$ | $C_2$ | $C_3$ | Flange | $D_1$ | $D_2$ |
|---|---|---|---|---|---|---|
| Temperature | 210° C. | 170° C. | 150° C. | 165° C. | 155° C. | 155° C. |
| Screw rotation speed | | | 50 r.p.m. | | | |
| Die pressure | | | 350–430 kg/cm$^2$ | | | |

As is apparent from Table 1, the products of this invention (Examples 16–19) showed far greater expansion ratios than the product of Comparative Example 8 (two-stage extrusion product of polystyrene). The expansion ratios of the invention products also exceeded those of the products of Comparative Examples 9 and 10 (commercially available foams).

TABLE 1

| | Dylark #232 | Dylark #332 | DIC Styrene CR-4500 | Sodium acetate | Sodium carbonate | Sodium hydrogen-carbonate | Lubricant | Wetting agent | Nucleating agent | Auxiliary foaming agent | Expansion ratio of prefoamed pellets | Expansion ratio of foam |
|---|---|---|---|---|---|---|---|---|---|---|---|---|
| Example 16 | 100 | | | 1.0 | | | 0.5 | 0.05 | 1.5 | 0.3 | 2.0 | 15.0 |
| Example 17 | | 100 | | 1.0 | | | 0.5 | 0.05 | 1.5 | 0.3 | 2.0 | 18.0 |
| Example 18 | 100 | | | | 1.0 | | 0.5 | 0.05 | 1.5 | 0.3 | 2.0 | 14.0 |
| Example 19 | | 100 | | | | 1.0 | 0.5 | 0.05 | 1.5 | 0.3 | 2.0 | 16.0 |
| Comparative example 8 | | | 100 | 1.0 | | | 0.5 | 0.05 | 1.5 | 0.3 | 1.2 | 1.5 |
| Comparative example 9 | Commercial product (polystyrene-type closed cellular article which used low-boiling foaming agent) | | | | | | | | | | — | 8.5 |
| Comparative example 10 | Commercial product (polystyrene-type closed cellular article which used low-boiling foaming agent) | | | | | | | | | | — | 10.0 |

Lubricant: zinc stearate
Wetting agent: CARNATION
Nucleating agent: CROWN TALC (P-2, particle diameter 8.5 microns, produced by Matsumura Sangyo Co., Ltd., Japan)
Auxiliary foaming agent: CaSO$_4$.2H$_2$O

EXAMPLES 20-24

The experiments were carried out by operating as in Examples 16-19 and Comparative Examples 8-10, except that the foaming compounds were changed as shown in Table 2. As shown in Table 2, products of high expansion ratios of the order of 11-15 were obtained in all of the examples.

TABLE 2

| | Dylark #232 | Dylark #332 | Calcium oxalate | Sodium lactate | Sodium tartrate | Sodium benzoate | Magnesium carbonate | Lubricant | Wetting agent | Nucleating agent | Auxiliary foaming agent | Expansion ratio of prefoamed pellets | Expansion ratio of foam |
|---|---|---|---|---|---|---|---|---|---|---|---|---|---|
| Example 20 | | | 1.0 | | | | | 1.5 | 0.1 | 3.0 | 0.3 | 2.0 | 14.0 |
| Example 21 | 100 | | | 1.0 | | | | 1.5 | 0.1 | 3.0 | 0.3 | 2.0 | 13.0 |
| Example 22 | | 100 | | | 1.0 | | | 1.5 | 0.1 | 3.0 | 0.3 | 1.4 | 11.0 |
| Example 23 | | 100 | | | | 1.0 | | 1.5 | 0.1 | 3.0 | 0.3 | 1.3 | 12.0 |
| Example 24 | | 100 | | | | | 1.0 | 1.5 | 0.1 | 3.0 | 0.3 | 1.5 | 14.0 |

Nucleating agent: HAKUENKA CCR (particle diameter 0.08 micron, produced by Shiraishi Calcium Co., Ltd., Japan)
Auxiliary foaming agent: CaHPO$_4$.2H$_2$O
The wetting agent and lubricant were the same as those indicated hereinbefore.

We claim:

1. A process for producing a highly foamed product consisting essentially of styrene/maleic anhydride copolymer resin foam characterized by reacting the copolymer resin with at least one blowing agent selected from the group consisting of a carboxylate of a metal of group Ia of the periodic table of elements and a carboxylate of a metal of group IIa.

2. A process for producing a highly foamed styrene/maleic anhydride copolymer resin foam which comprises first obtaining a mixture consisting essentially of said copolymer resin and at least one blowing agent selected from the group consisting of a carboxylate of a metal of group Ia of the periodic table of elements and a carboxylate of a metal of group IIa, then melt-blending the mixture, followed by extruding and granulating the blend to form a pre-expanded granular product, and thereafter foaming the granular product thus obtained by reacting the copolymer resin with the blowing agent.

3. The process of claim 1 which comprises using 90-99.9% by weight of said styrene/maleic anhydride copolymer resin and 0.1-10% by weight of said blowing agent.

4. The process of claim 1 wherein the carboxylate is obtained from a carboxylic acid selected from the group consisting of mono-carboxylic acids, dicarboxylic acids, hydroxymonocarboxylic acids and hydroxy-polycarboxylic acids.

5. The process of claim 2 which comprises using 90-99.9% by weight of said styrene/maleic anhydride copolymer resin and 0.1-10% by weight of said blowing agent.

6. The process of claim 2 wherein the carboxylate is obtained from a carboxylic acid selected from the group consisting of mono-carboxylic acids, dicarboxylic acids, hydroxymonocarboxylic acids and hydroxy-polycarboxylic acids.

7. The process of claim 2 wherein the pre-expanded granular product has an expansion ratio of less than 2.0.

* * * * *